Aug. 11, 1964  D. J. GOLDSTEIN ETAL  3,143,880
VISCOSITY COMPENSATED FLOWMETER
Filed June 20, 1960
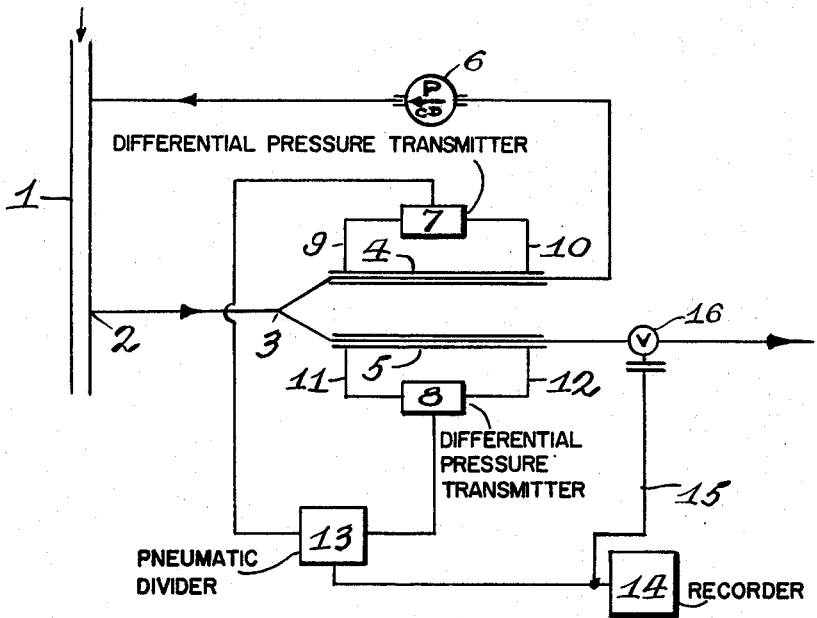
Inventors
DAVID J. GOLDSTEIN
SAMUEL S. GRIMLEY
By H. Rowlinson
         Agent

United States Patent Office 3,143,880
Patented Aug. 11, 1964

3,143,880
VISCOSITY COMPENSATED FLOWMETER
David John Goldstein, Ville de Lemoyne, Quebec, and Samuel Slater Grimley, Beloeil Station, Quebec, Canada, assignors to Canadian Industries Limited, Montreal, Quebec, Canada, a corporation of Canada
Filed June 20, 1960, Ser. No. 37,143
Claims priority, application Canada Sept. 10, 1959
2 Claims. (Cl. 73—205)

This invention relates to the measurement of fluid flow and, more particularly, to the measurement of the rate of flow of fluids, the viscosity, density and temperature of which vary rapidly.

Of all the flowmeters known in the art, none appears suitable for measuring the rates of flow of the aforesaid fluids, particularly when the rates are very low and the fluids fairly viscous. For example, all measuring devices based on pressure difference, such as orifice, capillary, nozzle or venturi meters, are markedly dependent on the viscosity of the fluids, as also are drag meters. On the other hand the variable area-type of meter, such as the rotameter, may be made independent of density and also of viscosity, but only for small changes in this last property. Such a meter is not suitable, for example, for measuring the rate of flow of oils at varying temperatures, where the viscosity may rapidly change by as much as a factor of three or four.

Amongst the remaining types of meter, the thermal meter, depending on the loss of heat from a body immersed in the flowing fluid, is nominally independent of viscosity but is not so in fact due to the variation of the boundary layer thickness with viscosity. It is furthermore unsuitable for fluids the temperature of which changes widely and rapidly. Similarly, turbine-type meters are unsuitable for small rates of flow.

It is an object of this invention to provide a method for measuring the rate of flow of a fluid, which method is independent of variations in the viscosity, density or temperature of the fluid. Another object is to provide an apparatus for measuring and controlling said flow. Further objects will apear hereinafter.

The method of this invention comprises essentially dividing the flowing fluid into two streams, passing one of said streams through a first constriction, passing the other stream through a second constriction, both streams being in substantially identical physical condition and under streamline condition of flow, controlling the flow of said first stream by a constant volume pump, determing the pressure drop across each constriction and calculating from said pressure drop the rate of flow of said second stream.

It is known that the volume rate of flow of a fluid through a constriction is substantially proportional to the pressure drop in the flowing fluid across said constriction, at least in the case of streamline flow through tubes. For example, the well known Hagen-Poiseuille equation for flow through a tube is:

$$Q = -\frac{\pi \Delta P d^4}{128 \mu l}$$

where:

Q is the volume rate of flow,
$\Delta P$ is the pressure drop,
$d$ is the diameter of the tube,
$l$ is the length of the tube, and
$\mu$ is the viscosity of the fluid.

If a flowing fluid is divided into two streams and each of said streams is immediately passed into a constriction, the viscosity, density and temperature of the streams can readily be kept identical. Thus one arrives at the following relationships in the case of tubular constrictions:

$$Q_1 = -\frac{\pi \Delta P_1 d_1^4}{128 \mu l_1}$$

$$Q_2 = -\frac{\pi \Delta P_2 d_2^4}{128 \mu l_2}$$

and $$\frac{Q_1}{Q_2} = \frac{d_1^4 l_2}{d_2^4 l_1} \times \frac{\Delta P_1}{\Delta P_2}$$

There are available at present pumps which are capable of passing a very constant volume of fluid in a given time independent of variations in the viscosity and temperature of the fluid being pumped. If such a pump is used to control the volume of fluid passing through one constriction, either $Q_1$ or $Q_2$ may be defined.

Then $$Q_1 = K \frac{\Delta P_1}{\Delta P_2} \times Q_2 \qquad (1)$$

where K is a constant depending only on the dimensions of the tubular restrictions. If $Q_2$ is defined by a constant volume pump, then values of the flow rate $Q_1$ are given by the ratio of the pressure drop across the two constrictions. This is the basis of the new method of this invention.

The apparatus used in the method of this invention comprises essentially two tubular fluid flow constrictions, a fluid flow-dividing means to the downstream arms of which said constrictions are connected, a constant volume pump connected to one of said constrictions and pressure difference-measuring means connected across each of said constrictions.

The apparatus of this invention has the particular advantage that it is used in the streamline flow region whereas viscosity-compensated meters of the rotameter type are limited to use in the turbulent flow region where meter reading vs. flow rate is not linear. Streamline flow is the well known condition of flow at a Reynold's number of less than 2000.

The two constrictions need not be identical, but if the constrictions are not identical the apparatus will require calibration to evaluate the constant K in Equation 1. Thus, in a preferred embodiment of the invention, the constrictions are substantially identical and the flow rate $Q_1$ may be calculated directly from values $$\frac{\Delta P_1}{\Delta P_2}$$

and known $Q_2$, because in this case $K=1$.

The flow rate $Q_2$ is controlled by a constant volume pump which is independent of the viscosity of the fluid supplied to it. Several such pumps are available commercially but, in general, the precision gear type pump is preferred. It is also preferred that the pump be on the downstream side of the constriction to which it is attached, since it is essential that the fluid reaches both constrictions in the same physical condition and hence the constrictions should be as near to the flow divider as possible. However, if it is desired to put the pump on the upstream side of the constriction, the flow may be divided, one stream metered through the pump, and then both streams brought to substantially identical physical condition by, for example, passing them through coils immersed in a temperature equalizing bath.

The pressure difference measuring devices of the apparatus of this invention may be very simple, e.g. liquid manometers, or more elaborate, such as the various commercially available electrical or pneumatic differential pressure cells which transmit a signal dependent on the input pressure difference. In the former case, the desired flow rate can be calculated manually while in the latter, it is convenient to divide the signals from the transmitters automatically and continuously and display the required flow rate on a chart recorder.

Further modification of the apparatus of this invention can render it useful as a flow controlling device. The output of the signal divider is a direct function of flow rate and hence may be used to control the flow through the second constriction by known feed-back means. For example, the flow rate may be controlled to a preset but alterable value by the insertion of a variable diaphragm valve in the stream leaving the second constriction and the control of said valve by the output of the signal divider.

The invention will be better illustrated by reference to the accompanying drawing which is a schematic view of one embodiment of the apparatus of the invention. The scope of the invention is, of course, not limited thereto, particularly with respect to the type of constriction and pressure difference-measuring means.

In the drawing, 1 represents an oil supply manifold from which oil is removed at 2 and passed to a flow divider 3. Thence the two streams pass through capillary tubes 4 and 5 after which one stream proceeds through a constant volume pump 6 and back to the manifold 1. The other stream, the flow rate of which is to be measured, then proceeds to its point of use.

The pressure differences across the capillary tubes 4 and 5 are observed by two differential pressure transmitters 7 and 8, by means of oil pressure through tubes 9 and 10 or 11 and 12.

The signals from transmitters 7 and 8 are divided by a pneumatic divider 13 and the result recorded by a recorder 14. The resulting record is proportional to the flow through capillary tube 5; if the capillary tubes 4 and 5 are substantially identical, the proportionality factor is the known pumping rate of pump 6. If the divider 13 and recorder 14 are pneumatic and the motor driving the pump 6 is explosion-proof, then the flowmeter is suitable for use in explosive atmospheres.

As an additional modification, the signal from divider 13 can be transmitted through tube 15 to a pneumatically controlled diaphragm valve 16 located on the downstream side of tube 5 for the purpose of controlling the flow of the fluid to its point of use to a constant value which may be adjusted.

The following example illustrates this invention when used to measure the supply of catalyst to ethylene polymerization vessels, the catalyst being a peroxide and being used in solution in paraffin oil. This example is not intended to limit the scope of the invention since the method and apparatus of the invention may both be used quite generally to measure and control fluid flows, particularly under the difficult conditions hereinbefore described.

EXAMPLE

In an apparatus similar to that shown in the accompanying drawing, the capillaries 4 and 5 were of 0.14" internal diameter and 10.0" length. The differential pressure transmitters 7 and 8 were Foxboro D/P cells, the divider 13 a Sorteberg Force Bridge capable of pneumatically dividing two signals, both of which are varying. The pump 6 was a gear pump manufactured by Northern Ordnance Inc. driven at 570 r.p.m.

The viscosity of the paraffin oil varied with temperature as shown in Table I.

Table I

| T° C.: | $\mu$ (poise) |
|---|---|
| 25 | 1.52 |
| 35 | 0.82 |
| 45 | 0.47 |
| 55 | 0.34 |

The throughput of the pump 6 was commendably constant over a similar range, as is shown in Table II.

Table II

| T° C.: | Time for 1000 ccs. in minutes |
|---|---|
| 20.0 | 1.381 |
| 34.5 | 1.388 |
| 39.5 | 1.388 |
| 44.0 | 1.383 |
| 48.5 | 1.381 |

In Table III are given the results obtained with the scale of the pneumatic recorder calibrated at 32° C.: the results are given for the actual flow against the scale reading at 32°, 40° and 50° C. It can be seen that the error is less than 3% full scale (10 gal./hr.) for a change in viscosity of approximately 3 times.

Table III

| Scale reading, Imp. gal./hr. | Measured flow—Imp. gal./hr. | | |
|---|---|---|---|
| | 32° C. | 40° C. | 50° C. |
| 1.0 | 1.00 | 0.90 | 0.88 |
| 3.0 | 2.94 | 2.79 | 2.72 |
| 5.0 | 5.01 | 4.89 | 4.77 |
| 7.0 | 6.98 | 6.98 | 6.76 |
| 9.0 | 9.17 | 9.06 | 8.74 |

What we claim is:

1. An apparatus for measuring the flow rate of a fluid whose viscosity and temperature change rapidly, which comprises two substantially identical capillary tubes, a fluid flow dividing means to the downstream arms of which said capillary tubes are connected, a constant volume pump connected to the first of said capillary tubes and pressure difference measuring means connected across each of said capillary tubes, said apparatus being so constructed and arranged that the fluid passes through both of said capillary tubes in streamline flow and in substantially identical physical condition, and that the fluid flow to be measured passes only through the second of said capillary tubes and the flow rate thereof equals the ratio of the pressure drop across the second capillary tube to that across the first capillary tube multiplied by the flow rate through the constant volume pump.

2. An apparatus for measuring the flow rate of a fluid whose viscosity and temperature change rapidly, which comprises two substantially identical capillary tubes, a fluid flow dividing means to the downstream arms of which said capillary tubes are connected, a constant volume pump connected to the first of said capillary tubes and differential pressure cells connected across each of said capillary tubes, said apparatus being so constructed and arranged that the fluid passes through both of said capillary tubes in streamline flow and in substantially identical physical condition, and that the fluid flow to be measured passes only through the second of said capillary tubes and the flow rate thereof equals the ratio of the pressure drop across the second capillary tube to that across the first capillary tube multiplied by the flow rate through the constant volume pump, there being included means for automatically and continuously dividing the outputs of said differential pressure cells and means responsive to said dividing means for displaying the resulting signal as a direct measure of flow rate.

References Cited in the file of this patent

UNITED STATES PATENTS

| 2,042,374 | Wunsch et al. | May 26, 1936 |
| 2,494,673 | Smith | Jan. 17, 1950 |
| 2,538,824 | Andresen | Jan. 23, 1951 |
| 2,570,410 | Vetter | Oct. 9, 1951 |
| 2,833,298 | Shannon | May 6, 1958 |
| 2,917,066 | Bergson | Dec. 15, 1959 |
| 3,015,233 | Ryder et al. | Jan. 2, 1962 |
| 3,034,352 | Blay | May 15, 1962 |